United States Patent [19]

Yamano

[11] Patent Number: 4,596,327
[45] Date of Patent: Jun. 24, 1986

[54] DISTRIBUTIVE FEEDING DEVICE FOR COMBINATION WEIGHING MACHINE

[75] Inventor: Shoji Yamano, Akashi, Japan

[73] Assignee: Yamato Scale Company, Limited, Hyogo, Japan

[21] Appl. No.: 588,743

[22] Filed: Mar. 12, 1984

[30] Foreign Application Priority Data

Mar. 18, 1983 [JP] Japan ............................. 58-40461[U]

[51] Int. Cl.$^4$ ............................................. B65G 47/19
[52] U.S. Cl. ................................. 198/533; 198/566; 198/771; 177/25
[58] Field of Search .......................... 177/DIG. 11, 25; 198/533, 537, 539, 566, 601, 771, 609

[56] References Cited

U.S. PATENT DOCUMENTS 3,469,672 9/1969 Stutske et al. ....................... 198/771

FOREIGN PATENT DOCUMENTS 57-160021 10/1982 Japan .
2074329 10/1981 United Kingdom .
440492 1/1975 U.S.S.R. ............................. 198/601

Primary Examiner—Robert J. Spar
Assistant Examiner—Jonathan D. Holmes
Attorney, Agent, or Firm—Senniger, Powers, Leavitt and Roedel

[57] ABSTRACT

A device for feeding product from a single source to a plurality of weighing units of a combination weighing machine, which are arranged in circular array, comprising a centrally disposed generally circular dispersion feeder for radially dispersing the product fed to its center portion and a plurality of radially disposed vibration conveyer troughs communicating with the respective weighing units for receiving the product from the periphery of the dispersion feeder and conveying them to the corresponding weighing units.

3 Claims, 3 Drawing Figures

DISTRIBUTIVE FEEDING DEVICE FOR COMBINATION WEIGHING MACHINE

This invention relates to a device for feeding product from a single source distributively to a plurality of weighing units of a combination weighing machine arranged in a circular array.

A typical example of a combination weighing machine provided with this type of feeding device is disclosed in the opened Japanese patent specification No. 57-160021. This feeding device comprises a so-called dispersion feeder located in the center of the circular array of weighing units and a plurality of conveyer troughs arranged radially around the dispersion feeder to connect it to the respective weighing units. The dispersion feeder has the general shape of a flat cone and is supported on an electromagnetic vibrator to be subject to mechanical vibration in operation. Each conveyer trough has one end located under the periphery of the dispersion feeder and the other end located above a weighing or holding hopper of each weighing unit, and is also supported on an electromagnetic vibrator. Product to be weighed is fed to the center portion of the dispersion feeder and dispersedly shifted to its periphery by the aid of vibration to tend to fall onto the respective conveyer troughs which are selectively subject to vibration to convey the product to the corresponding hoppers.

In such feeding device, when product falls in the conveyer troughs, some of it may drop in gaps between adjoining troughs. In order to prevent this trouble, the conveyer trough of the above-cited patent specification has one side wall bent or folded outwards so as to cover the other side wall of the adjoining trough. Thus, the abovementioned problem has been solved by this structure but the latter has introduced a new problem as follows.

In this type of feeding device, the respective conveyer troughs are driven into vibration individually and selectively in order to feed product only to those weighing units which participated in a combination and then have been unloaded. Therefore, any conveyer trough must not influence mechanically the adjacent troughs. However, in the above-cited feeding device, the side wall of one trough folded into the adjacent trough may contact with the product in the latter trough. This would result in unwanted feed of product on the latter trough to the corresponding filled weighing unit due to vibration of the former trough.

Therefore, an object of this invention is to provide an improved feeding device for combination weighing machine, in which vibration of any conveyer trough never influences the adjacent troughs.

In accordance with this invention, an improved distributive feeding device is provided for a combination weighing machine having a plurality of weighing units arranged in a circular array. The device includes a generally circular dispersion feeder located in the center of said array for dispersively shifting product fed to its central portion to its periphery, and a plurality of conveyers arranged radially from the periphery of the dispersion feeder to the respective weighing units and driven individually and selectively for feeding the product to the corresponding weighing units. As a feature of this invention, the dispersion feeder has a plurality of projections extending radially outwards from its periphery to cover the respective gaps between the adjacent ones of said conveyers in order to prevent the product from falling into said gaps.

These and other features and operation of this invention will be described in detail hereinunder with reference to the accompanying drawings.

Figure 1:
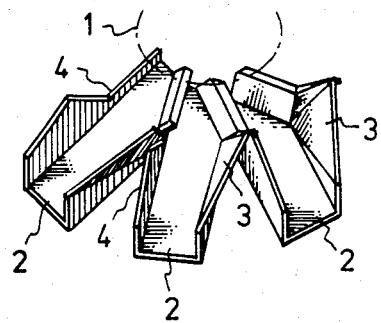
FIG. 1 is a perspective view representing a part of the above-cited prior art feeding device.

As described previously, the prior art distributive feeding device includes a generally circular dispersion feeder 1, as shown in phantom in FIG. 1, and a plurality of conveyer troughs 2, only three of which are shown, arranged radially around the feeder 1. Though not shown in the drawing, holding or weighing hoppers interlocked with the respective weighing units are disposed just under the front ends of the respective troughs 2. In order to cover the gaps between the adjoining troughs 2, one side wall 3 of each of the respective troughs 2 is folded outwards so as to enclose the other side wall 4 of the adjoining trough 2 together with the gaps therebetween. In operation, the dispersion feeder 1 is driven to feed product uniformly and simultaneously to the respective conveyer troughs 2, while the conveyer troughs 2 are driven selectively and individually to feed the product thereon to unloaded empty hoppers only. In this prior art device, however, the folded end or edge of the side wall 3 of one trough 2 extends into the adjoining trough and may contact with the product in the latter trough. Therefore, when the former trough is driven into vibration for feeding the product to the corresponding empty hopper, this vibration will be transferred through the folded side wall 3 to the product in the latter trough to result in unwanted feeding to the corresponding filled hopper. Such unwanted feeding may cause serious problems such as excessive loading, erroneous discharge and consequent mismeasurement of combined weight.

Figure 2:
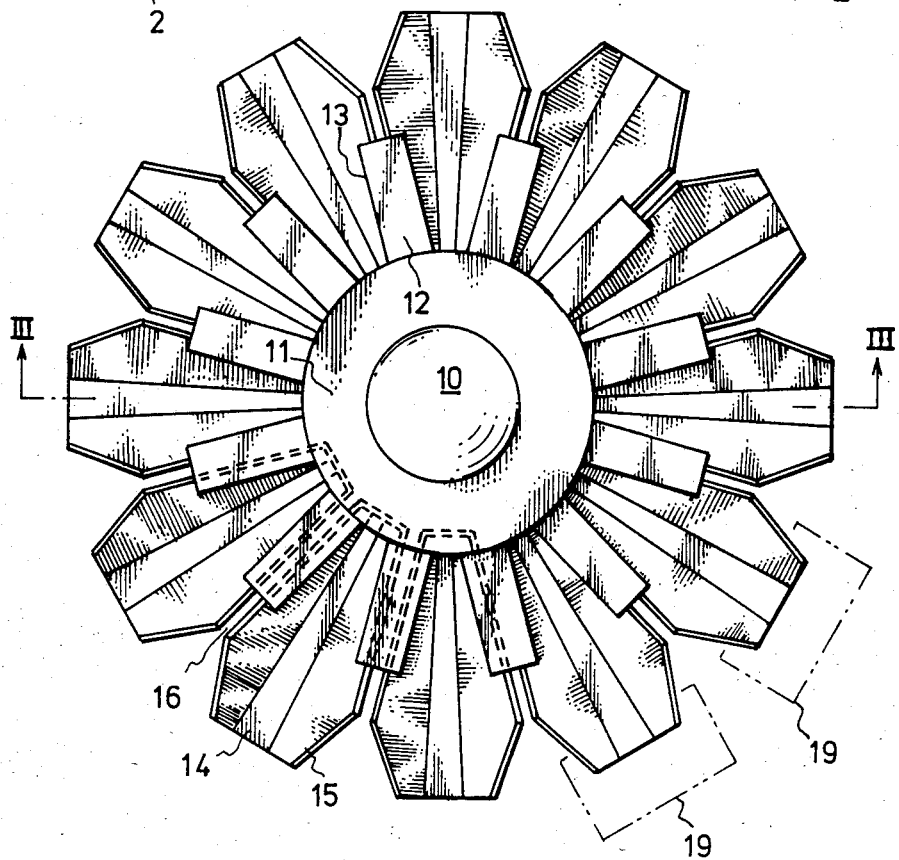
FIG. 2 is a plan view representing an embodiment of the distributive feeding device according to this invention.
Figure 3:
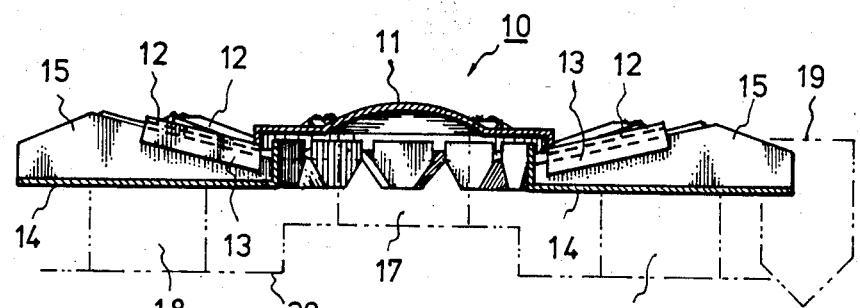
FIG. 3 is a sectional side view taken along line III—III of FIG. 2.

Referring next to FIGS. 2 and 3, the embodiment of this invention includes a dispersion feeder 10 having a circular, partly domed main body 11 and a plurality of projections 12 extending radially outwards from the periphery of the main body 11. The device also includes a plurality of conveyer troughs 14 each having side walls 15 and arranged radially with gaps 16 therebetween. As shown in the drawings, the projections 12 of the feeder 10 are located just above the gaps 16 and provided with side walls 13 extending downwards into the adjoining troughs 14, so that the gaps 16 are covered perfectly by the projections 12 so as to prevent the product from falling therein during operation. As shown in FIG. 3, each projection 12 is preferably inclined upwardly and outwardly together with the side walls 15 of the troughs 14. The main body 11 of the dispersion feeder 10 is supported by an electromagnetic vibrator 17 which is in turn supported on a machine frame 20. The vibrator 17 may be a known type for subjecting the feeder 10 preferably to helical vibration (i.e. vibration with vertical and circumferential components, but no radial component). Each conveyer trough 14 is supported by an individual electromagnetic vibrator 18 which is also supported on the machine frame 20. The vibrator 18 may be a known type for subjecting the trough 14 to slanting linear vibration. The machine frame 20 also supports a plurality of holding hoppers 19 co-operating with the respective conveyer troughs 14 and also with the corresponding weighing hoppers (not shown) in well-known fashion. The components 17, 18, 19 and 20 are shown in phantom since they are well known in the art and, moreover, they are not part of this invention. It should be noted that there is no contact between each projection 12 and the corresponding conveyer trough 14.

In operation, products are fed to the central portion of the main body 11 of the dispersion feeder 10 by a suitable means, not shown, such as belt conveyer, and heaped up there. Continuing to feed the products, the heaped-up products tumble down to the periphery and then into the respective conveyer troughs 14 by the aid of helical vibration of the body 11. As the helical vibration of the feeder 10 has no effect of radially forcing the products, those products fallen into the troughs 14 are no longer shifted radially so long as the vibrators 18 of the respective troughs 14 are not energized. However, when a specific vibrator 18 is energized selectively to subject the corresponding conveyer trough 14 to well-known linear slanting vibration along the trough, the products thereon are shifted radially to the front (outer) end thereof and then fed into the corresponding holding hopper 19, and the products on the dispersion feeder 10 successively tumble down into the trough 14, until a predetermined time lapses and the vibrator is de-energized. This is also the case in any selected ones of the conveyer troughs 14.

Each projection 12 may contact the products in the conveyer troughs 14 at both sides thereof. However, it never forces these products radially, since it is subjected to circumferential vibration only together with the main body 11. Therefore, even if a specific conveyer trough 14 is subjected to vibration to shift the products thereon, this vibration and the movement of products will not affect the products in the adjoining troughs 14.

Various modifications and changes can be made within the scope of this invention as defined in the apended claims. For example, the shape of the body 11 of the dispersion feeder 10 can be designed arbitrarily, such as conical, spherical, flat or concave, in accordance with the kind of products. Moreover, the projections 12 may be horizontal or slanting down radially outwards, instead of slanting down radially inwards as illustrated above. In addition, the vibration of the dispersion feeder 10 may be simply vertical or circumferential, instead of the abovementioned helical vibration, so long as the vibration has no radial component.

I claim:

1. A distributive feeding device, used in a combination weighing machine, comprising a plurality of weighing units arranged in a circular array, said device including a dispersion feeder of generally circular shape located in the center of said array for dispersively moving product fed to its central portion toward its periphery, and a plurality of conveyor means arranged radially between the periphery of said dispersion feeder and said weighing units, respectively, and driven individually and selectively for feeding said product to corresponding weighing units; wherein said dispersion feeder is formed with a plurality of projections extending radially from its periphery to cover the gaps between adjoining ones of said conveyor means for preventing the product from falling into said gaps, each conveyor means having the shape of a trough having side walls, each of said projections having downwardly extending side walls and being arranged to cover the gap between two adjoining conveyor means in such manner that adjacent side walls of said two adjoining conveyor means are located between the side walls of said projection with the side walls of the projection extending down into the troughs of said two adjoining conveyor means without contacting the conveyor means, said dispersion feeder being free of vertical obstruction at its periphery thereby to permit product to move to the periphery and then to drop off the feeder into respective conveyor means, and said projections being inclined radially outwardly and upwardly with respect to the periphery of the feeder.

2. A distributive feeding device, in accordance with claim 1, wherein said dispersion feeder is provided with vibratory driving means for subjecting said feeder to a vibration having no radial component.

3. A distributive feeding device, in accordance with claim 1, wherein each projection has a width not substantially greater than the width of its respective gap.

* * * * *